(12) United States Patent
Maylon

(10) Patent No.: US 6,367,216 B1
(45) Date of Patent: Apr. 9, 2002

(54) FASTENER CLIP FOR SECURITY WALL SYSTEM

(75) Inventor: Gary J. Maylon, Trussville, AL (US)

(73) Assignee: Alabama Metal Industries, Birmingham, AL (US)

( * ) Notice: Subject to any disclaimer, the term of this patent is extended or adjusted under 35 U.S.C. 154(b) by 0 days.

(21) Appl. No.: 09/226,048

(22) Filed: Jan. 4, 1999

(51) Int. Cl.$^7$ .................................................. E04F 13/04
(52) U.S. Cl. ............................ 52/454; 52/361; 52/363; 52/347; 52/512; 52/745.09; 411/457; 411/468; 411/531
(58) Field of Search ..................... 52/344, 346, 347, 52/355, 357, 351, 361, 362, 363, 511, 512, 454, 410, 745.06, 745.09; 411/457, 461–468, 160, 161, 531, 533

(56) References Cited

U.S. PATENT DOCUMENTS

| | | |
|---|---|---|
| 1,242,609 A | 10/1917 | Schumacher et al. |
| 1,308,265 A | 7/1919 | Spear et al. |
| 1,373,036 A | 3/1921 | Upson |
| 1,682,551 A * | 8/1928 | Chamberlain ................. 52/454 |
| 1,763,263 A * | 6/1930 | Shanks ......................... 52/362 |
| 1,763,264 A * | 6/1930 | Shanks ......................... 52/362 |
| 1,841,905 A | 1/1932 | Meiswinkel |
| 1,925,774 A * | 9/1933 | Phillips ........................ 52/346 |
| 1,935,536 A | 11/1933 | Balduf |
| 2,120,049 A | 6/1938 | Winship |
| 2,303,103 A | 11/1942 | Adams |
| 2,313,325 A | 3/1943 | Dalton |
| 2,339,841 A | 1/1944 | Deuchler et al. |
| 2,983,080 A | 5/1961 | Whiteside |
| 3,026,660 A * | 3/1962 | Brown .......................... 52/364 |
| 4,649,689 A | 3/1987 | Everman et al. |
| 4,763,456 A * | 8/1988 | Giannuzzi .................. 52/512 X |
| 4,803,823 A * | 2/1989 | Stenson .................... 52/512 X |
| 5,069,589 A * | 12/1991 | Lemke ......................... 411/533 |
| 5,118,235 A * | 6/1992 | Dill ............................. 411/368 |
| 5,531,052 A | 7/1996 | Agar |
| 5,546,723 A * | 8/1996 | Jones .......................... 52/410 |
| 5,697,195 A | 12/1997 | Maylon |
| 5,915,903 A * | 6/1999 | Osterle et al. ................ 52/512 |

FOREIGN PATENT DOCUMENTS

IT 493514 * 4/1954 ................. 411/466

* cited by examiner

Primary Examiner—Winnie S. Yip
(74) Attorney, Agent, or Firm—Alston & Bird LLP

(57) ABSTRACT

A fastener clip for use in constructing a security wall system, and a security wall system so constructed are disclosed. The fastener clip has an elongate smooth surfaced planar body, a counter-sunk fastener recess formed s centrally within the body, a fastener opening defined within the recess and extending therethrough, and at least two spaced prongs formed as a part of the body which extend away from the body in a common direction. The fastener recess is sized and shaped to fit within an opening of a rigid mesh wall panel placed in registry with at least one structural frame member of a building. A threaded fastener is passed through the fastener opening and driven into the frame member to seat a bottom portion of the recess and a driving head of the fastener against the frame member. The security wall system includes at least one rigid mesh wall panel for being fastened to the at least one frame member of the building by a plurality of the described fastener clips, and may also include an exterior wall covering, for example gypsum board, fastened to the at least one frame member over the at least one mesh wall panel and the fastener clips.

25 Claims, 7 Drawing Sheets

FASTENER CLIP FOR SECURITY WALL SYSTEM

FIELD OF THE INVENTION

The invention relates in general to fastener clips used in the construction of wall systems. More particularly, the invention relates to a fastener clip for use in the construction of a security wall system in which the fastener clip is used to fasten, and fix the position of a rigid mesh wall panel on a building framework and over which a gypsum wall board panel will be placed.

BACKGROUND OF THE INVENTION

A security closet, also known as a saferoom is a room constructed within and as a part of a building, typically a residential dwelling, which is provided with reinforced walls and a secure door such that in an event of a home invasion, for example, the occupants of the dwelling can retreat to the security closet, lock themselves within, and call the authorities. An additional feature of a security closet is that it can also be used as a saferoom for not only protecting the occupants of a dwelling, but also for the storage of valuables and other objects which need to be protected from theft, as well as from being tampered with by children, for example.

Security closets are constructed by reinforcing the walls, and ceiling if desired, of a room within a building, typically a windowless closet in a residential dwelling, with a solid wood core or metallic door equipped with a dead bolt operable from inside the room, as well as outside the room with the appropriate key in order to permit the occupants of a dwelling to retreat to the security closet and lock themselves therein if need be. The construction of a typical security closet will involve the fastening of a series of rigid metallic mesh wall panels to the building framework forming the walls of the security closet and over which a gypsum board will be fastened. The building framework, as known, will be comprised of a series of parallel and upstanding wooden or light gauge metallic wall studs spaced on centers from one another in the range of from 16" to 24."

The security mesh wall panel, typically an expanded metal wall panel, is placed over the wall studs and is fastened thereto by screws in the case of wooden studs, and by screws or being welded thereto in the case of light gauge steel framing studs. When fastening the expanded metal wall panel to the wall studs with fasteners, a wafer head screw, a screw provided with a washer formed as a part of the screw head, is typically used by placing the screw at a corner of one of the regularly spaced, typically diamond shaped, openings formed in the wall panel, in registry with a wall stud. The screw is driven into the building framework such that the wafer head holds a portion of the mesh wall panel against the stud.

The installation technique of fastening expanded metal wall panels to a series of wall studs using wafer head screws, described above, places the screw in a narrow corner of the diamond shaped opening such that the other side of the head hangs out over an opening defined by the diamond. This presents two problems with the security of the connection. First, if an upward pressure is applied to the mesh, as for example when a crowbar is used pry the mesh upward, the mesh can slip out from under the edge of the screw. Secondly, if the installer is not alerted to the problem and does not place the screws along alternating sides of the respective diamond shaped openings along the framing member, it becomes possible to shift the sheet of expanded metal to one side and remove it from the screw heads if, for example, all the screw heads are located on the same or common side of the diamond shaped openings in the panel.

Another drawback with the use of wafer head screws is that this is not a screw commonly used or carried by gypsum board, also referred to as "wallboard", installers, for example, who will typically be the craftsmen that will fasten the expanded metal wall panels on the studs and then place and fasten the overlying gypsum board or wallboard thereon, which requires the use of a separate type of screw, commonly referred to as a "bugle head" screw, to fasten the board to the wall studs. This requires that the wallboard installer carry two different types of screws, which in turn increases the expense of constructing the security room as wafer head screws are generally more costly than conventional threaded gypsum board fasteners, and which may also lead to less than adequate fastening of the wall panel to the studs in that a wafer head screw is not readily adapted for being placed into a screw gun used to drive threaded fasteners into a building framework during the building construction process. The possibility thus exists that the wafer-head screws will not be driven into the framework of the building as deeply as they should, which, for the reasons described above, can undesirably lead to the ability to remove the expanded metal wall panel from the building framework to gain access into the security close/saferoom.

Yet another problem encountered when using wafer head screws to fasten expanded metal wall panels to a building framework is that the screw heads will tend to form a series of raised surfaces, for example bumps or ridges, on the exterior outwardly facing surface of the gypsum board/wallboard panel placed thereover when finishing the exterior surface of the wall to which the expanded metal wallboard is fastened. This problem is most troublesome where the profile of the wafer head screws increases the overall thickness of the wall at the window and door frame openings of the building, primarily in the ability to neatly "trim" these openings.

Although the problems of using wafer head screws, or of using ordinary fasteners with washers, can be avoided if the expanded metal wall panel is welded to the wall studs if they are made of a light gauge steel, this presents problems in and of itself. First, the cost of welding the mesh to the studs of the walls is much greater than using threaded fasteners. Second, this welding is typically done with wire fed welders of the type required when welding light gauge steel framing because of the thickness of the metal. This oftentimes is not practical to accomplish outside of a welding shop adapted to handle this type of welding. For example, certain environmental conditions can have a detrimental effect on this type of welding operation when done in the field. Moreover, some job sites are not conducive to welding because of the bulkiness, and the amount of equipment necessary, to weld the wall panels to the steel wall studs.

There is a need, therefore, for an improved wall fastener adapted for use with expanded metal security wall panels that should overcome the problems of allowing the expanded metal wall panel of a security wall system to be moved or shifted on the wall studs of the security closet after the mesh wall panel has been fastened thereto. There is also a need for such an improved fastener for use as a part of a security wall system which will use an ordinary fastener of the type used to fasten gypsum board, for example, to a wall stud rather than requiring the use of a separate type of screw, for example a wafer head screw.

Lastly, there is a need for such an improved security wall system fastener, and/or fastener assembly, which will not increase the overall thickness of the wall such that unsightly waves, seams, or ripples are not formed in the exterior finished wall once it is constructed. Such an improved security wall system fastener/fastener assembly should also be easy to manufacture, rugged and durable both in structure and in use, and constructed such that it will allow for the construction of a security closet in an efficient and workmanlike manner.

SUMMARY OF THE INVENTION

It is to these, and the other objects and advantages of the present invention, which include not only an improved wall fastener, but also provide for an improved security wall system, to which the invention is directed. The improved wall fastener of this invention is provided as a fastener clip having an elongate smooth surfaced planar body. A fastener recess is formed centrally within the body, and defines a fastener opening therethrough. At least two, and preferably four, elongate prongs are punched out, i.e., formed as a part, of the body and are spaced radially from one another about the fastener opening, each such prong extending away from the planar body of the fastener in a common direction. The fastener recess also extends away from the planar body in this common direction.

In a first aspect of the invention, the prongs of the fastener clip extend in the common direction for a length greater than the depth of the recess in this direction, such that the prongs are sized to be securely engaged on a security mesh wall panel as a threaded fastener is passed through the opening defined within the recess of the fastener clip to secure the mesh wall panel to the framework of a building, typically to the wall studs of a designated security closet or saferoom.

In its several embodiments, the smooth surfaced planar body of the fastener clip can be formed in any desired geometric shape, to include, for example, but not limited to, a diamond, a circle, a square, and a rectangle. The fastener recess defined within the body is counter-sunk such that as a threaded fastener, for example a gypsum board fastener or screw, also referred to as a "bugle head" screw, is passed through the fastener opening and into the building framework, that a driving head formed at one end of the fastener screw will be housed within the recess such that it is positioned below the plane of the fastener clip body. In this fashion, the fastener clip will lie substantially flat on the expanded metal wall panel after it has been used to fasten the mesh wall panel to the building framework.

The novel security wall fastener of this invention may thus be used as a part of a security wall system for attachment to the structural framework of a building. The system will include at least one expanded metal wall panel which defines a plurality of regularly spaced openings therein, at least one fastener clip of the type described above for fastening the mesh wall panel to the framework of the building, and an elongate fastener for being passed through the fastener clip and into the structural framework of the building for securing the mesh wall panel to the building framework. The security wall system also includes a gypsum board/wallboard panel for being fastened to the building framework over the expanded metal wall panel and the fastener clips used to fasten the metal wall panel to the building framework.

A unique feature of the novel fastener clip of this invention is that by including a fastener recess which extends away from the planar body of the fastener clip, that as the fastener used to secure the wall panel to the building framework is passed through the fastener opening defined within the recess of the fastener clip, the driving head of the fastener will draw a bottom portion of the fastener recess flat against the building framework which will in turn allow the driving head of the fastener itself to be seated firmly against the building framework to prevent the introduction of a pry bar, for example, behind the fastener head and against the building framework if an attempt is made to pry the security mesh wall panel off of the building framework.

The fastener clip is sized and shaped to cover substantially all of a selected one of the openings defined by the mesh wall panel when placed thereover, such that in association with the prongs formed as a part of the fastener clip the fastener clip will securely fasten and position the wall panel on the building framework such that it cannot be shifted on the building framework by being "popped" off of the fasteners during an illicit attempt to break into the security closet constructed with this system.

Another feature of this invention lies in an improved method of constructing a security wall system in which a first rigid mesh wall panel is positioned on the framework of a building, a fastener clip is placed over a selected one of the openings defined within the mesh wall panel, and an elongate fastener is passed through an opening defined within the counter-sunk recess formed in the mounting clip. The fastener is driven into the building framework to seat both the recess of the mounting clip and a driving head of the fastener against the building framework so that the clip lies substantially flat along an outwardly facing surface of the mesh wall panel. This method also contemplates the step of overlapping the ends of a first and a second security mesh wall panel, respectively over one another upon and in registry with a building framework member, for example an upstanding wall stud, such that a single fastener clip can be placed on an aligned opening in both the first and second wall panels to securely fasten and position both of the wall panels on the building framework in fashion heretofore unknown in the art.

BRIEF DESCRIPTION OF THE DRAWINGS

Some of the objects and advantages of the present invention have been stated above, and others will appear as the description proceeds when taken in conjunction with the accompanying drawings, which are not necessarily shown to scale, in which.

DETAILED DESCRIPTION OF THE PREFERRED EMBODIMENTS

Figure 1A:
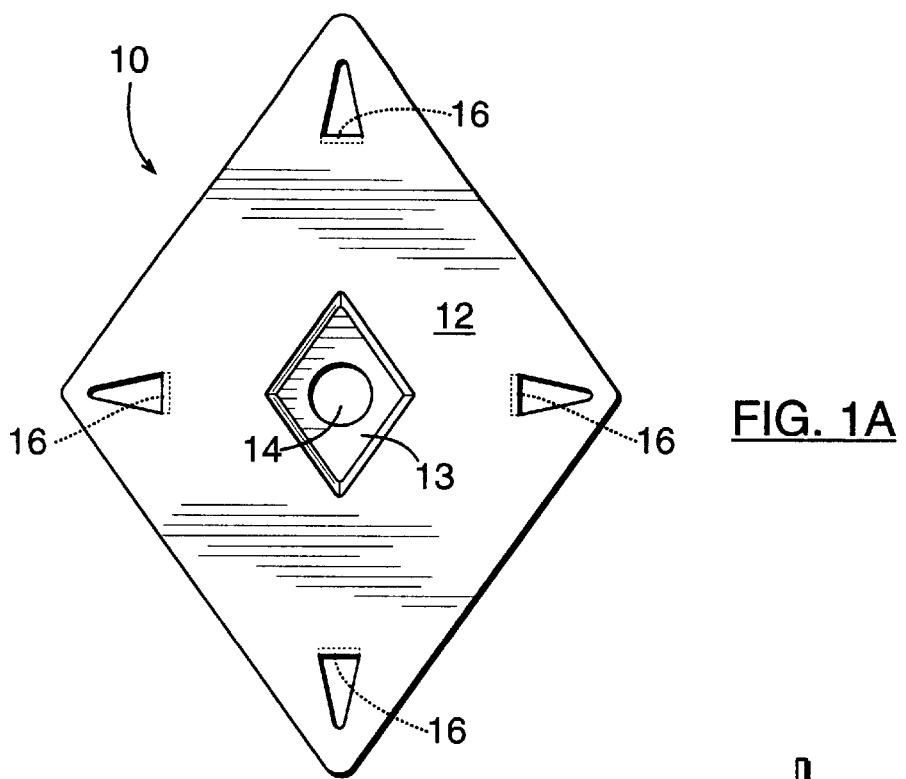
FIG. 1A is a top plan view of a first embodiment of the fastener clip of this invention.

The present invention will now be described more fully with reference to the accompanying drawings, in which like reference numerals indicate like parts throughout the several views, and in which several preferred embodiments in the invention are shown. It is understood by those skilled in the art that this invention may be embodied in many different forms, and should not be construed as being limited to the embodiments shown herein.

Figure 1B:
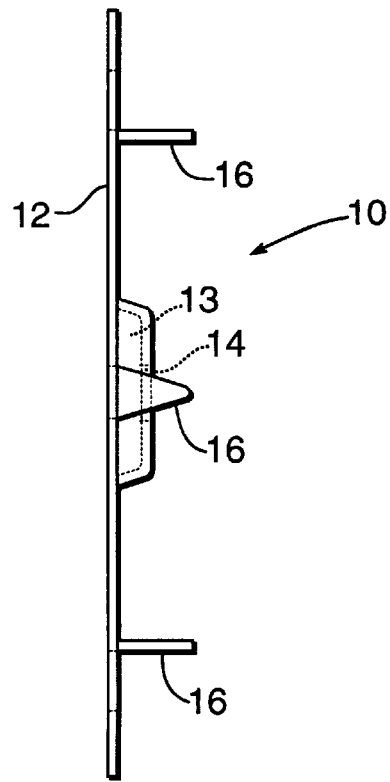
FIG. 1B is a side elevational view of the fastener clip of FIG. 1A.

A first embodiment of the fastener clip of this invention is illustrated in FIGS. 1A and 1B. As shown, the fastener clip 10 has a smooth surfaced diamond shaped planar body 12. A counter-sunk recess 13 is formed, by being stamped or punched, centrally within the body, and defines a fastener opening 14 which extends through the body such that a suitable threaded fastener can be passed therethrough for fastening the clip to the framework of a building. The fastener clip 10 will have at least two, and preferably four, prongs 16 stamped or punched out of the body panel, and all of which are shown to extend in a common direction in FIG. 1B. As also shown in FIG. 1B, the recess 13 extends in the direction of the prongs 16, although the length of the prongs in this direction, facing away from the body 12, is greater than the depth of the recess 13 counter-sunk within the body 12. The four prongs 16 are spaced from one another radially about the fastener opening 14 defined within the fastener recess 13.

Figure 2A:
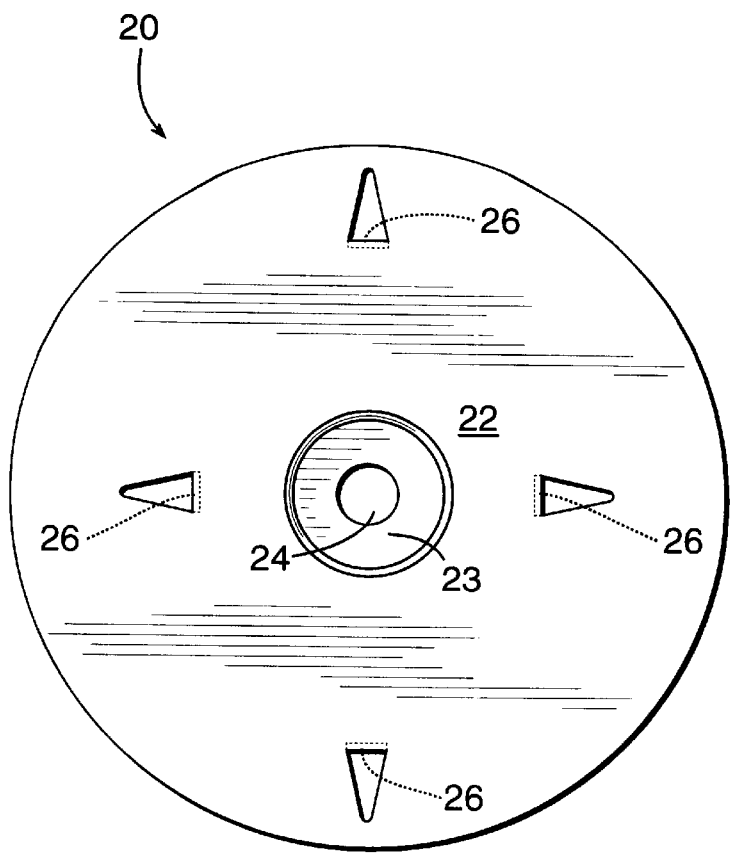
FIG. 2A is a top plan view of a second embodiment of the fastener clip of this invention.
Figure 2B:
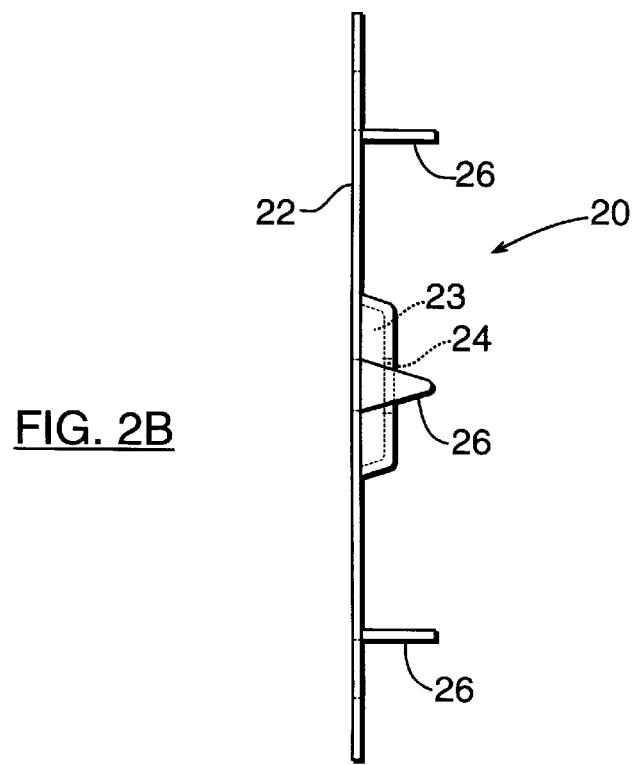
FIG. 2B is a side elevational view of the fastener clip of FIG. 2A.

A second embodiment of the fastener clip of this invention is shown in FIGS. 2A and 2B, which together illustrate a circular fastener clip 20 having a smooth surfaced circular planar body 22, with a centrally defined counter-sunk recess 23 formed as a part thereof by being stamped or punched therein, and which defines an opening 24 therein which extends through the body 12 so that a threaded fastener can be passed therethrough and into the framework of a building. Once again, this second embodiment of the fastener clip is provided with four prongs 26 stamped out of and formed as a part of the body 22 thereof, the prongs being spaced radially from one another about the opening 24 and extending away in a common direction from the planar body 22 of the clip to a length greater than the depth of the recess 23, which also extends in the common direction away from the planar body 22.

Figure 3A:
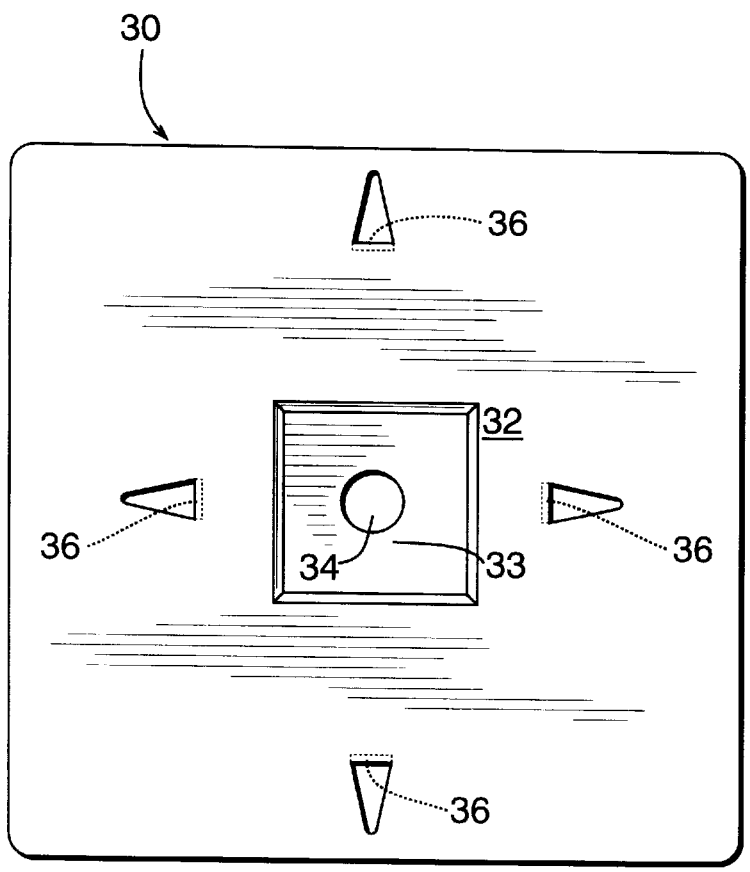
FIG. 3A is a top plan view of a third embodiment of the fastener clip of this invention.
Figure 3B:
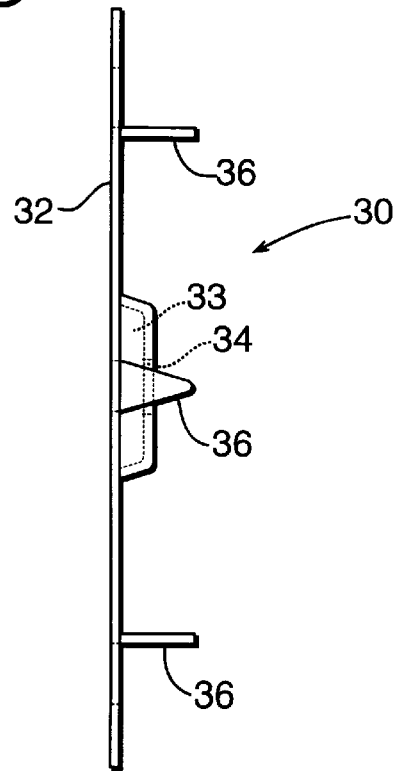
FIG. 3B is a side elevational view of the fastener clip of 3A.

A third embodiment of fastener clip 30 is illustrated in FIGS. 3A and 3B. Here the fastener clip 30 has a square, or quadrilateral, geometric shape such that it may also encompass a rectangular, smooth surfaced planar body 32. A centrally formed counter-sunk recess 33 is defined within the body, by stamping or punching, in which an opening 34 is defined which extends through the body 32 for receiving a threaded fastener therein. Four prongs 36 are also stamped out of the body 32, the prongs again extending in a common direction away from the body in the direction in which the recess 33 also extends. Each of the prongs 36 extends in the common direction away from the planar body 32 to a length greater than the depth of the recess 33.

Each of the three embodiments of fastener clip 10, 20, and 30, respectively, illustrated in FIGS. 1–3B, are formed from a rigid durable metal, for example from cold rolled steel. The steel may be galvanized for corrosion resistance, as so desired, or may be left uncoated where the fastener is used within a sheltered environment, such as a residential dwelling for example. Although the counter-sunk recess is shown as being diamond shaped, circular, or square shaped in FIGS. 1A, 2A, 3A, respectively, it is anticipated that any desired geometric shape or pattern may be formed when punching or stamping the respective recesses 13, 23, 33 within a clip of any desired size, shape, or pattern. The diamond, circular, and square shapes shown in FIGS. 1A, 2A, 3A, respectively, are presented for illustrative purposes only, and not by way of limitation.

It is preferred that the respective recesses within each embodiment of the clip, no matter the shape of the recess, be counter-sunk within and with respect to the planar body portion of the clip so that, and as described in greater detail below, as a fastener is passed through the respective openings defined within these recesses, that the driving head of the fastener is housed within the recess below the planar surface of the respective clip bodies such that the clip will lie substantially flat on the mesh wall panel being affixed to the building framework with these fastener clips and fasteners.

Figure 4:
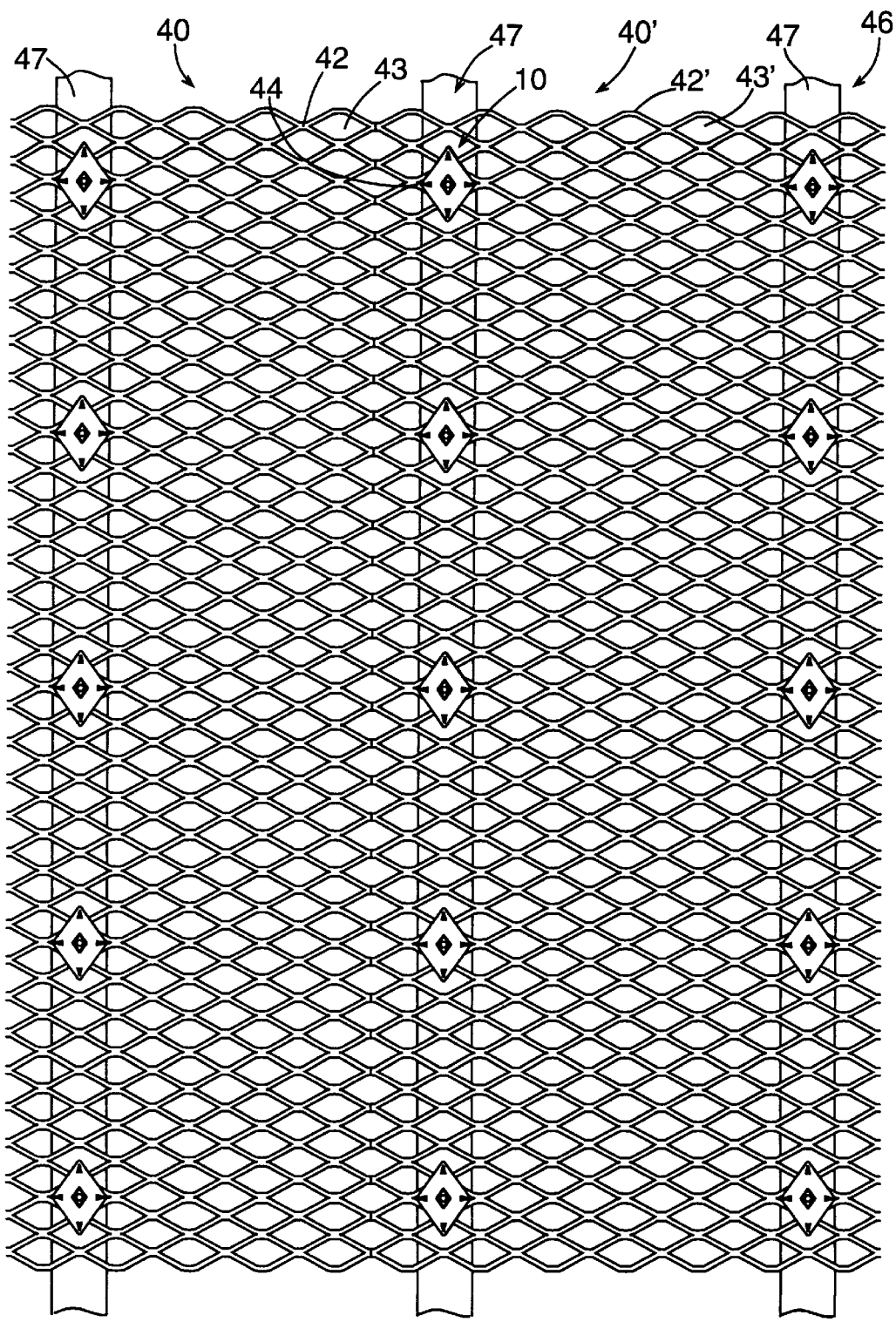
FIG. 4 is a partial elevational view of a building framework depicting an expanded metal wall panel provided as a part of a security wall system placed thereon, and secured thereto using a plurality of the fastener clips of FIGS. 1A and 1B.
Figure 5:
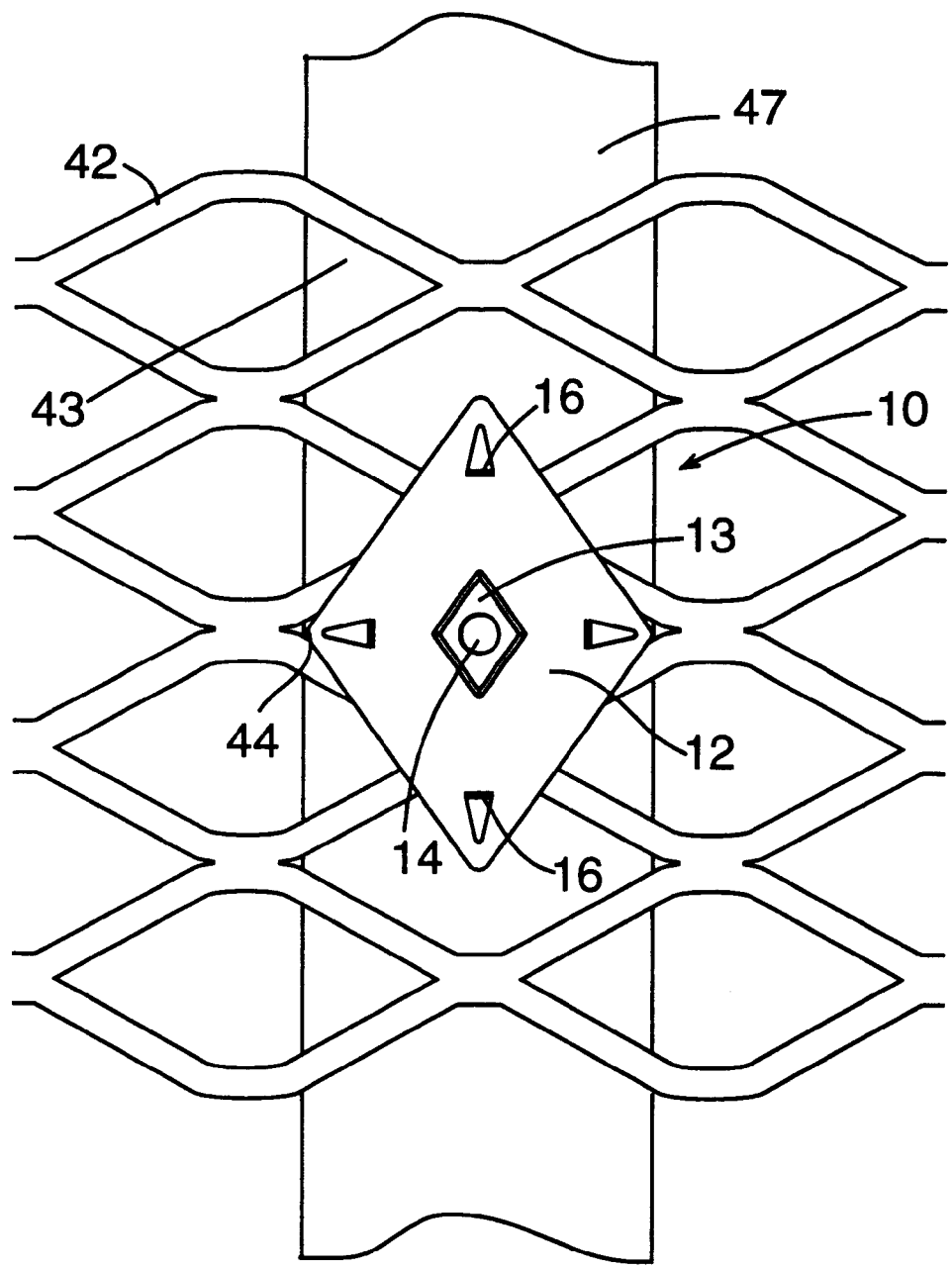
FIG. 5 is an enlarged detail of the manner in which one of the fastener clips of FIGS. 1A and 1B is used to secure the expanded metal wall panel of FIG. 4 to a wall stud provided as a part of a building framework.

Although four prongs are shown in each of the embodiments of the fastener clip of this invention, it is anticipated that there will always be at least two prongs formed such that, and as shown in FIGS. 4 and 5, once the fastener clip is placed substantially over a selected one of the openings within the mesh wall panel, the prongs may be hooked over the lattice of the mesh for the purpose of positioning the clip on the selected opening, as well as for positioning and securely fastening the mesh wall panel on the building framework after a suitable fastener (not illustrated) has been passed therethrough and into the building framework.

Turning therefore, to FIGS. 4 and 5, an expanded metal security mesh wall panel 40 is shown juxtaposed on a building framework 46 comprised of a spaced series of upstanding studs 47. The metal wall panel, in known fashion, is formed of an expanded metal such that a metallic lattice 42 is formed which defines a regularly spaced plurality of openings 43 along the length, and across the width, of the mesh wall panel. As shown in FIG. 4, the metal wall panel 40 will preferably be positioned on the wall studs 47 such that the lengthwise portion of the respective openings 43 defined by the wall panel extend perpendicularly with respect to the upstanding studs 47, although it is anticipated that the wall panel could extend in its lengthwise direction along studs 47 if so desired.

Also shown in FIG. 4 is a spaced series of fastener clips 10 of the type illustrated in FIGS. 1A and 1B, and described in greater detail above. These respective clips are preferably spaced from one another in a maximum range of from 8 " to 12" center to center along the length of each respective stud 47, which is in marked contrast to the use of conventional wafer head screws, which typically cannot be spaced from one another in this range. Each of the clips 10 is used with a threaded fastener (not illustrated) passed through the respective openings 13 (FIGS. 1A, 1B) thereof to securely fasten and position the mesh wall panel 40 on the building framework 46. Although it is anticipated that the fastener clips will be spaced on centers in the maximum range of from 8" to 12" apart from one another, as discussed, the clips may also be spaced more closely to one another than at the maximum range if so desired.

Although the mesh wall panel 40 is described as an expanded metal wall panel, it is anticipated that other suitable materials may be used to construct the mesh wall panel so long as a rigid mesh wall panel having a series of spaced openings formed therein is provided for being placed in position on the respective studs 47 of the building framework 46, such that respective ones of the fastener clips 10, for example, can be placed thereon, and a threaded fastener (not illustrated) passed therethrough and into the studs 47 for securing and positioning the mesh wall panel to the building framework. Alternate materials which may therefore be used to fabricate the mesh wall panel thus include rigid and durable plastics, fiberglass and/or carbon fiber compounds or lathes, although expanded metal is preferred.

FIG. 5 is an enlarged detail of how one of the fastener clips 10 described above is used to affix the mesh wall panel 40 of FIG. 4 to the wall studs 47 of the building framework. Referring to FIG. 5, therefore, a wall stud 47 is shown extending in an upward direction, with the length of the mesh wall panel extending perpendicularly with respect to the upstanding or lengthwise direction of the wall stud. The lattice 42 of the mesh wall panel defines a regularly spaced series of openings 43 therein, such that the fastener clip 10 is placed on a selected one of the openings 44 in registry with the wall stud 47 for the purpose of fastening the mesh wall panel to the wall stud.

The fastener clip 10, in its diamond shaped embodiment, as well as in its other embodiments shown in FIGS. 2A–3B, is placed on the selected one of the openings 44 such that the recess 13 is positioned within the opening and extends toward the wall stud. Two of the spaced prongs 16 are hooked over the lattice 42 of the mesh wall panel such that the fastener clip substantially overlies all of the selected one of the openings 44, and so that as a fastener 67 (FIG. 7) is passed through the opening 14 and driven into the wall stud, the fastener clip 10 will be drawn down toward and fastened to the wall stud while the upper-most and lower-most prongs 16 of the fastener clip 10 shown in FIG. 5 will trap or otherwise fix the position of the mesh wall panel on the wall stud such that it cannot be moved upwardly or downwardly. The two remaining prongs 16 extending in the lengthwise direction of the mesh wall panel will prevent the wall panel from sliding in its lengthwise direction. The fastener clip thus securely positions the metal wall panel on the building framework in a fashion heretofore unknown and previously unanticipated in the art.

Figure 6:
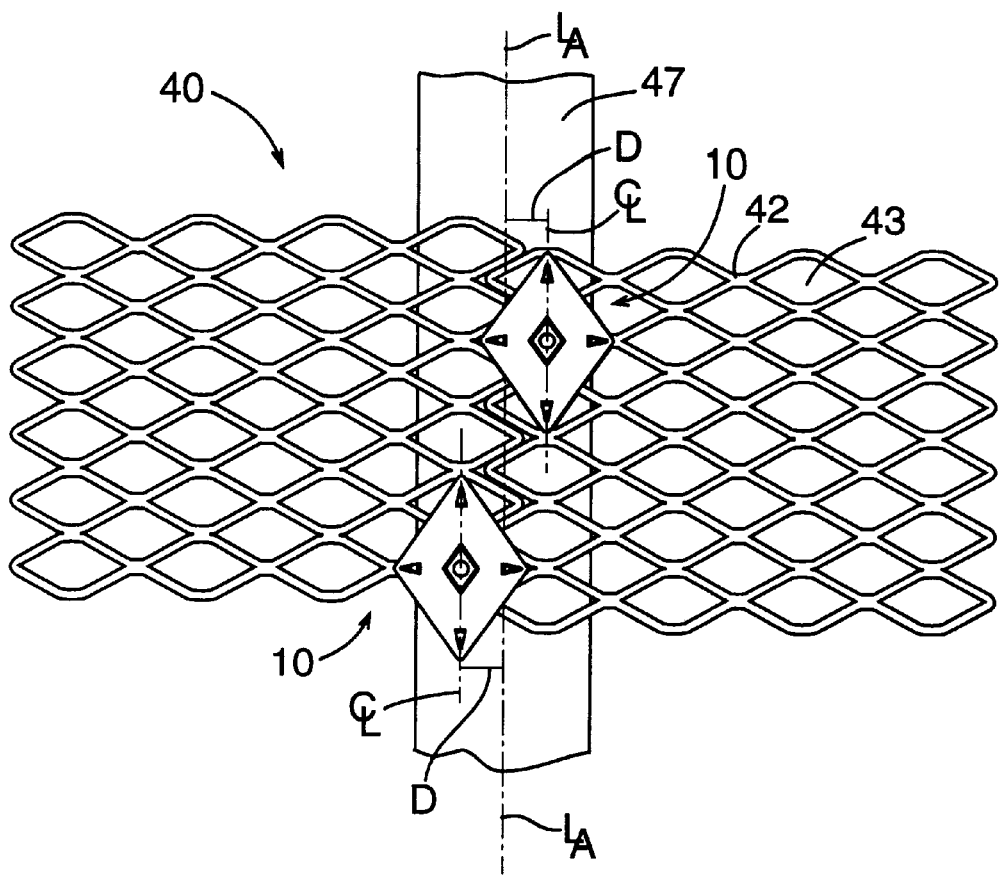
FIG. 6 is a partial elevational view of an alternate manner of securing an expanded metal wall panel to a wall stud using the fastener clips of FIGS. 1A and 1B of this invention.

FIG. 6 illustrates an alternate manner of using the fastener clips of this invention to affix the mesh wall panel 40 to the building framework. An upwardly extending wall stud 47 is shown, with a mesh wall panel 40 extending in its lengthwise direction perpendicularly with respect thereto. Two fastener clips 10 are shown, each fastener clip being positioned within a respective selected one of the openings defined by the lattice 42 of the metal wall panel 40. However, rather than being spaced in line as shown in FIG. 4, here the respective fastener clips are offset from one another with respect to a longitudinal axis, denoted by the reference character "$L_A$" extending in the lengthwise direction of the wall stud 47. Thus, and as shown, when measured from the center line, denoted by the reference character "$C_L$" of each fastener clip 10, each fastener clip is offset from the longitudinal axis by an offset distance D, which acts to not only securely i o fasten and position the wall panel 40 on the wall stud, but also provides greater resistance to the potential sliding of the metal wall panel on the wall studs, for example if being pried at the ends of the panel, such that the metal wall panel will have an even greater resistance to be "popped" off of the fastener clips 10.

It is preferred that the fastener clips 10 shown in FIG. 6 will extend in series offset from one another and with respect to the longitudinal axis "$L_A$" extending along the entire length of the wall stud, although the in-line arrangement of FIG. 4 is also acceptable for use in constructing the security wall system. Moreover, although not shown in FIGS. 4–6, it is anticipated that respective ones of the fastener clips 10, 20, or 30, of this invention will be used to affix the mesh wall panels to the floor plate, and ceiling plate or joist, if one is provided, formed as a part of the walls of the building framework, and of which the security closet and/or saferoom is constructed. Moreover, although diamond shaped fastener clips 10 are shown in FIGS. 4–6, these clips are shown only for illustrative purposes, and the fastener clips used may take on any desired geometric shape, as described above.

Figure 7:
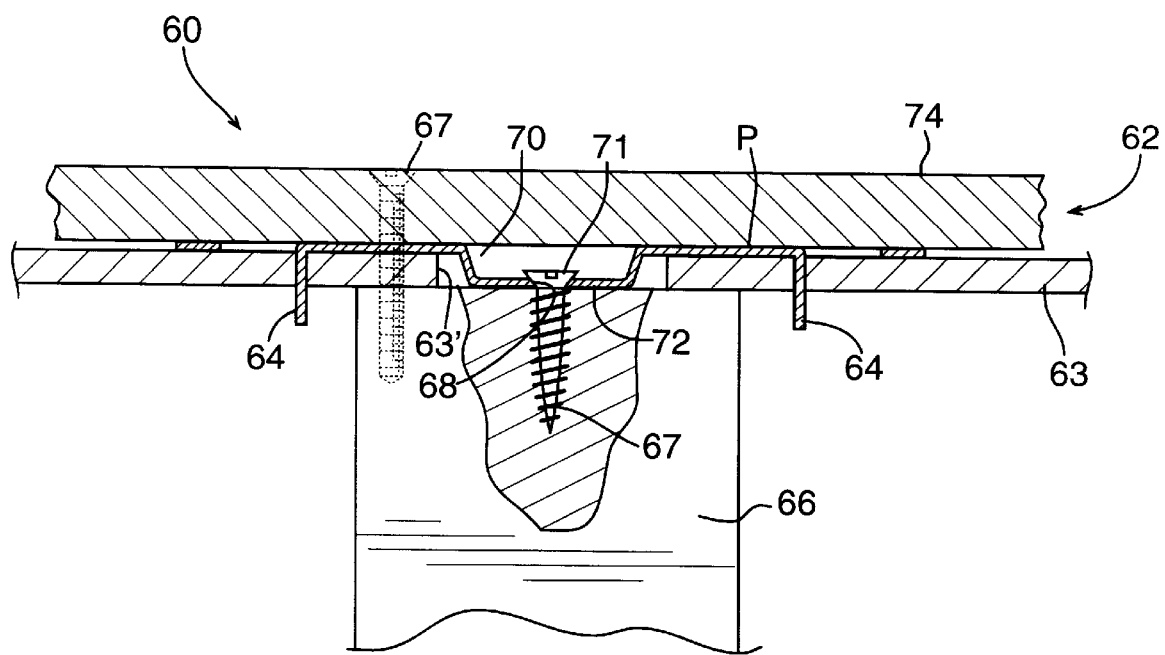
FIG. 7 is a partially sectioned side elevational view illustrating a security wall system constructed in accordance with the invention.

FIG. 7 illustrates a partial cross-sectional view through a completed security wall system 60 constructed in accordance with the invention. In this construction, a fastener clip 62, which may comprise any one of the fastener clips 10, 20, 30 described hereinabove, as well as any other fastener clip construction having the same features but a differently shaped planar body, is positioned on an expanded metal wall panel 63. The prongs 64 formed as a part of the fastener clip 62 are hooked over the lattice 42 (FIGS. 4–6) of the wall panel for positioning the fastener clip thereon, and for substantially overlying the selected one of the openings as shown.

As shown in FIG. 7, the fastener clip 62 is positioned on the expanded metal panel 63, and in particular on a selected opening 63' thereof such that the fastener clip is in registry with the upstanding wall stud 66 provided as a part of the building framework. Once this is done, an elongate threaded metal fastener 67, having preferably a "bugle" head, or a counter-sunk type of head, is passed through the opening 68 defined within the recess 70 of the fastener clip, such that after the fasteners passes through the opening and is driven into the wall stud, the driving head 71 thereof is housed within the recess 70 below the plane, denoted by the reference character "P", of the planar body of the fastener clip 62. In this manner, and as shown, once the fastener 67 has been driven into the wall stud 66, the fastener clip lies substantially flat on an outwardly facing surface of the metal wall panel 63.

Moreover, due to the counter-sunk construction of the recess 70, as the fastener 67 is driven into the wall stud 66, a bottom planar portion 72 of the recess is drawn against the outwardly facing surface of the wall stud, such that it becomes seated on the wall stud, which in turn allows the driving head 71 of the fastener 67 to also be seated firmly against the wall stud, and/or framing member of the building. In this manner, it becomes extremely difficult for a pry bar, for example, to be passed beneath the metal wall panel 63 and/or the driving head 71 of the fastener for the purpose of attempting to pry the metal wall panel off of the wall stud 66. When contrasted with the use of wafer head screws (not illustrated) as known in the art, in which it is possible for a pry bar to be passed over the metal wall panel, and beneath the wafer head of the screw within one of the openings of the mesh wall panel to pop the wafer head screw out, and/or pop the mesh off of the wafer head screw, this is not possible with the construction of the fastener clip 62 shown in FIG. 7, and as described in the several preferred embodiments hereinabove.

Another feature of constructing the fastener clip 62 as shown and described above is that it can use a conventional threaded fastener 67 such that when a gypsum wall board 74 is placed over the metal wall panel 63 for the purpose of finishing the security wall system, that this same type of fastener 67 can be used for fastening the wallboard to the wall studs, which allows a gypsum board installer and/or carpenter to carry a single type of fastener/screw with them when constructing the security closet, and which fasteners are readily adapted for being driven into a building framework using the known types of screw guns such that the wall can be constructed quickly and efficiently, and at reduced cost when contrasted with use of wafer head screws. The wall stud 66, as shown in FIG. 7, may be metallic, for example a light gauge steel, or may be a piece of dimensional lumber. The security wall system 60 of this invention is equally well suited for either type of construction.

The manner in which a security wall system 60 of this invention is constructed is described with reference to FIGS. 4–7. The method comprises the steps of first positioning a rigid mesh wall panel 40 (FIG. 4), having a plurality of regularly spaced openings 43 (FIG. 4) defined therein, against the upstanding wall studs 47 of a building framework 46 such that a selected one of the openings 44, FIGS. 4 and 5, overlies the building framework. Thereafter, a fastener clip is placed over the selected one of the openings such that the clip substantially overlies the opening. An elongate fastener 67 (FIG. 7) is then passed through the fastener opening defined within the recess of the fastener clip, the fastener being driven into the building framework such that it seats both the bottom portion 72 (FIG. 7) of the recess, and the driving head 71 (FIG. 7) of the fastening screw against the building framework so that the fastener clip lies substantially flat along the outwardly facing surface of the wall panel, as shown generally in FIGS. 4 and 6.

As a part of the step of placing the fastener clip over the selected one of the openings, the method also includes the step of hooking at least two of the elongate prongs 16 of the fastener clip 10 in FIGS. 4–6, or the prongs 64 of the fastener clip 62 in FIG. 7, over the lattice 42 (FIG. 4) of the mesh wall panel such that the prongs extend into respective ones of the openings defined within the mesh wall panel adjacent the selected opening to fix the position of the fastener clip on the mesh wall panel, and in turn to fix the position of the mesh wall panel on the building framework as the fastener is driven into the building framework.

When constructing a security closet, or saferoom, it is anticipated that several mesh wall panels 40 will be needed. Thus, it will be necessary to overlap the ends of the mesh wall panels where they abut one another by placing an end of a second mesh wall panel 40'(FIG. 4) in a partially overlapping relationship on an end of the first mesh wall panel along one of the wall studs 47 of the building framework, aligning a second selected opening 44' defined within the second mesh wall panel with the selected opening 44 of the first wall panel, and then placing the fastener clip 10 over the two respective selected ones of the openings such that the clip overlies both of the openings, whereupon the clip is fastened to the building framework as described above. The preferred method of constructing the security wall system also includes the step of spacing a plurality of fastener clips within a maximum range, on center, of from 8" to 12" with respect to one another in the lengthwise direction of the wall studs (FIG. 4), although the clips may be spaced more closely to one another than this maximum range, and may also include the step of positioning each respective clip of this plurality of fastener clips on opposite sides of the longitudinal axis $L_A$ shown in FIG. 6, also extending in a lengthwise direction of the wall stud.

The method of constructing a security wall system 60, as shown in FIG. 7, also includes the step of positioning a wallboard panel over the security mesh wall panel and the fastener clip, and then fastening the wallboard panel to the building framework using an identical one of the fasteners 67 used to secure the fastener clips 62 to the building framework.

Although the construction of the security wall system 60 is described with respect to an upstanding wall in FIGS. 4–7, it is anticipated that this same type of construction could be used in constructing a ceiling of a security closet as well. Moreover, although the use of a gypsum wallboard 74 is described above, and illustrated in FIG. 7, it is anticipated that the expanded metal wall panel 40 could be coated with a plaster and/or stucco-like wall covering such that the metal wall panel becomes embedded in the finished wall much as would a conventional plaster lath. Moreover, although the fastener 67 has been referred to herein as a bugle head or counter-sunk type of threaded fastener, it is anticipated that any type of fastener, whether threaded or not, for example a nail, suitable for attaching the respective embodiments of the fastener clip to a building framework may be used.

Many modifications and other embodiments of the invention will come to mind to one skilled in the art to which this invention pertains, having the benefit of the teachings presented in the foregoing description and the associated drawings. It is thus to be understood that the invention is not to be limited to the specific embodiments disclosed herein, and that many modifications and other embodiments in the invention are intended to be included within the scope of the appended claims. For example, although several embodiments of the fastener clip according to the present invention have been described primarily as being diamond shaped, circular, or square, it is understood that the fastener clips could just as well be hexagonal, octagonal, or of any other desired shape, or made of any suitable rigid and durable material in addition to galvanized or uncoated cold rolled steel. Moreover, although specific terms are employed herein, they are used in a generic and descriptive sense only, and not for the purpose of limiting the described invention or the claims which follow hereinabove.

I claim:

1. A fastener clip for use in fastening a rigid mesh wall panel having a plurality of openings therein to the structural framework of a building, said clip comprising:

a substantially planar body having a peripheral edge and a thickness defined by a pair of opposed planar surfaces;

a counter-sunk fastener recess in said planar body, wherein said recess extends in a direction from the planar surfaces of said body and terminates at a distal end;

an opening defined at the distal end of said recess sized and shaped to receive and retain a fastener passed through the opening for securing said clip to the structural framework of the building; and at least two prongs being spaced from said fastener opening and extending away from said body in said direction, said prongs further being spaced from said peripheral edge by a planar portion of said planar body, said prongs being adapted for engagement within the openings of the mesh wall panel and said planar portion being adapted for engagement with the mesh wall panel when the clip is fastened to the structural framework of the building so that the mesh wall panel is securely fastened to the framework.

2. The fastener clip of claim 1, comprising four of said prongs spaced from one another about said opening of said clip.

3. A fastener assembly for use in fastening a mesh wall panel of a security wall system to the structural framework of a building, the wall panel defining a plurality of spaced openings therein, said fastener assembly comprising:

a fastener clip, said clip including:
a substantially planar body having a peripheral edge and a thickness defined by a pair of opposed planar surfaces;
a counter-sunk fastener recess in said planar body, wherein said recess extends in a direction from the planar surfaces of said body and terminates at a distal end;
an opening defined at the distal end of said recess sized and shaped to receive and retain a fastener passed through the opening for securing said clip to the structural framework of the building; and
at least two prongs being spaced from said fastener opening and extending away from said body in said direction, said prongs further being spaced from said peripheral edge by a planar portion of said planar body, said prongs being adapted for engagement within the openings of the mesh wall panel and said planar portion being adapted for engagement with the mesh wall panel when the clip is fastened to the structural framework of the building so that the mesh wall panel is securely fastened to the framework;
a fastener having a head and elongated body, wherein said elongated body is structured to pass through said opening of said clip and into the structural framework of the building.

4. The fastener assembly of claim 3, wherein each of said at least two prongs has a length extending in said direction greater that the depth of said recess in said direction.

5. Security wall system for attachment to the structural framework of a building, said system comprising:
at least one expanded metal wall panel defining a plurality of uniformly spaced openings therein:
at least one fastener clip for fastening said at least one wall panel to the framework of the building, said clip including:
a planar body;
a counter-sunk fastener recess formed centrally within said body and defining an opening therethrough;
at least two elongate prongs formed as a part of said body, said al least two prongs being spaced from one another about said opening and extending away from said body in a common direction; and
an elongate fastener for being passed through said opening of said fastener clip and into the structural framework of the building;
said at least two prongs being sized and shaped to be separately hooked over the at least one wall panel into separate ones of the openings, respectively, defined within said at least one wall panel adjacent a selected opening upon which said at least one fastener clip is placed so that the body of said clip covers substantially all of said selected opening;
said fastener recess being sized and shaped to be moved directly into said selected opening of said mesh wall panel to against the structural framework of the building, so that said at least one fastener clip securely positions and fastens said at least one wall panel on the framework of the building, as said fastener is passed through said opening of said fastener clip and driven into the building framework.

6. A security wall system for attachment to the structural framework of a building, said system comprising:
a rigid mesh wall panel for being mounted on the building framework, said wall panel having a plurality of uniformly spaced openings defined therein;
a fastener clip for fastening said wall panel to the building framework, said clip having a planar body, a counter-sunk fastener recess formed centrally within the planar body and extending outwardly from the planar body, and an opening through the planar body defined within said recess;
said clip being sized and shaped to cover substantially all of the openings defined by said wall panel when said clip is placed thereover and said recess being sized to fit within one of the openings of the wall panel; and
an elongate fastener for being passed through said opening in said clip and into the framework of the building,
said fastener recess being fitted within one of the openings in said wall panel and said fastener passed through said opening of said clip and into the building framework, wherein the planar body of said clip is adjacent to said wall panel and said fastener recess is fitted within one of openings of said wall panel, such that said clip holds and secures said wall panel to the building framework.

7. The system of claim 6, said mesh wall panel comprising an expanded metal panel.

8. The system of claim 6, the body of said clip further comprising at least two elongate prongs formed as a part thereof, said at least two prongs being spaced from one another about said opening of said clip and extending away from the body in the direction of said recess.

9. The system of claim 8, wherein said clip comprises four of said elongate prongs.

10. The system of claim 8, each of said at least two prongs being sized and shaped to be hooked over the wall panel into a separate one of the openings of said wall panel, respectively, defined within said panel adjacent said selected opening for positioning said clip thereon.

11. The system of claims 6, wherein said fastener comprises a driving head at one of its ends, and wherein said recess is sized and shaped to house said driving head therein and below the plane of said body after the fastener has been passed into the building framework.

12. The system of claim 6, wherein said clip lies substantially flat on said wall panel once said fastener is passed into the building framework.

13. The system of claim 6, further comprising a wallboard panel for being fastened to the building framework over said mesh wall panel and said fastener clip.

14. The system of claim 13, wherein said elongate fastener is a threaded screw, and wherein said elongate fasteners are used to separately fasten said fastener clip and said wallboard panel to the framework of the building.

15. A security wall system for being constructed as a part of the structural framework of a building, said system comprising:
an expanded metal wall panel for being mounted on the building framework, said wall panel having a plurality of uniformly spaced openings defined therein;
at least one fastener clip for fastening said wall panel to the framework of the building, said clip comprising a planar body, a counter-sunk fastener recess formed centrally within and extending outwardly from said body, an opening through said body defined within said recess, and at least two elongate prongs formed as a part of and extending from said body and spaced from one another about said opening;

said clip being sized and shaped to cover substantially all of a selected one of the openings defined by said wall panel when said clip is placed thereover, each of said at least two prongs being sized and shaped to be hooked over the portion of the wall panel defining the selected one of said openings for positioning said clip thereon; and an elongate fastener sized and shaped to be passed through said opening and into the structural framework of the building;

wherein said fastener recess is sized and shaped to seat said fastener against the framework of the building, and to house a driving head of said fastener therein, as said fastener is passed through said opening and into the building framework and thereby holds and secures the wall panel to the building framework.

16. A method of constructing a security wall, said method comprising:
   a) positioning a first mesh wall panel, the wall panel having a plurality of uniformly spaced openings defined therein, against a building framework so that a selected one of the openings in the wall panel overlies the building framework;
   b) placing a first fastener clip having a planar body and a counter-sunk recess extending outwardly from the planar body and sized to fit within one of the openings of the mesh wall panel, wherein said placing step fits the counter-sunk recess into the opening of the mesh wall panel so that said clip substantially overlies said opening and the counter-sunk recess is fitted within the opening in the wall panel;
   c) passing an elongate fastener through an opening defined within the counter-sunk recess formed within said fastener clip; and
   d) driving said fastener into the building framework and seating a drive head of the fastener against the counter-sunk recess of said fastener clip, wherein the planar body of said clip is adjacent to said mesh wall panel and said fastener recess is fitted within one of openings of said mesh wall panel, such that said clip holds and secures said mesh wall panel to the building framework.

17. The method of claim 16, step d) further comprising the step of positioning a driving head of said fastener within said recess as the fastener is driven into the building framework so that said driving head is positioned within said recess and below to a planar body portion of said fastener clip.

18. The method of claim 16, further comprising the step of drawing said fastener clip substantially flat against an outwardly facing surface of said mesh wall panel as said fastener is driven into the building framework.

19. The method of claim 16, comprising the step of spacing a plurality of said fastener clips within a range, on center, of from eight inches to twelve inches apart from one another on the building framework.

20. The method of claim 16, comprising the step of spacing a plurality of said fastener clips at a distance, on center, of twelve inches apart from one another on the building framework.

21. The method of claim 19, comprising the step of positioning each respective clip of said plurality of clips on opposite sides of a longitudinal axis extending in the lengthwise direction of the building framework.

22. The method of claim 16, further comprising the steps of positioning a wallboard panel over said mesh wall panel and said fastener clip, and fastening said wallboard panel to the building framework.

23. The method of claim 22, the step of fastening said wallboard panel to the building framework including the step of fastening said wallboard panel to the building framework such that said fastener clip does not increase the thickness of the security wall so constructed.

24. The method of claim 22, comprising the step of using separate ones of said fasteners to separately both said fastener clip and said wallboard panel, respectively, to the framework of the building.

25. A method of constructing a security wall, said method comprising:
   a) positioning a first mesh wall panel, the wall panel hang a plurality of uniformly spaced openings defined therein, against a building framework so that a selected one of the openings in the wall panel overlies the building framework;
   b) placing a first fastener clip having at least two elongate prongs formed as part of said fastener clip and extending from the clip over the selected one of the openings so that said clip substantially overlies said opening;
   c) hooking each of the least two elongate prongs over said mesh wall panel and into a separate one of the openings, respectively, defined within the mesh wall panel adjacent said selected opening to fix the position of said clip thereon, and to fix the position of the mesh wall panel on the building framework in response thereto;
   d) passing an elongate fastener through an opening defined within a counter-sunk recess formed within the clip; and
   e) driving said fastener into the building framework, such that a head of the elongate fastener is located within the counter-sunk recess of the clip and the clip holds and secures the mesh wall panel against the building framework.

* * * * *

UNITED STATES PATENT AND TRADEMARK OFFICE
CERTIFICATE OF CORRECTION

PATENT NO. : 6,367,216 B1
DATED : April 9, 2002
INVENTOR(S) : Maylon

It is certified that error appears in the above-identified patent and that said Letters Patent is hereby corrected as shown below:

Title page,
Item [56], References Cited, U.S. PATENT DOCUMENTS,
"3,026,660" should read -- 3,023,660 --.

Item [57], ABSTRACT,
Line 4, after "formed" cancel "s".

Column 11,
Line 27, after "framework;" insert -- and --;
Line 47, "al" should read -- at --.

Column 12,
Line 41, "claims 6" should read -- claim 6 --.

Column 14,
Line 29, "hang" should read -- having --.

Signed and Sealed this

Twenty-fourth Day of December, 2002

JAMES E. ROGAN
*Director of the United States Patent and Trademark Office*